Nov. 18, 1969  J. PUMA  3,479,640
BRAKE LINING WEAR DETECTOR
Filed Nov. 8, 1967 3 Sheets-Sheet 1
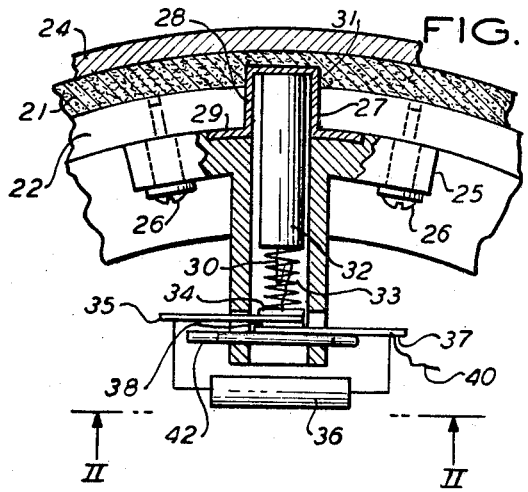
FIG. 1
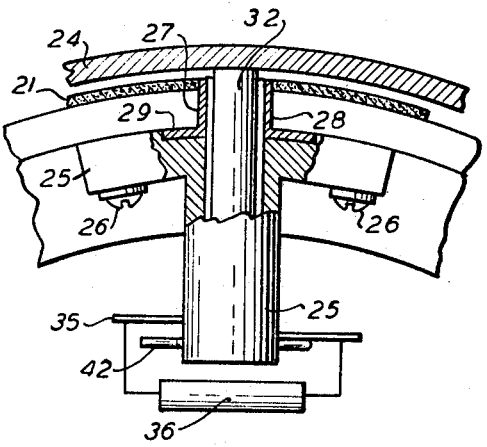
FIG. 3
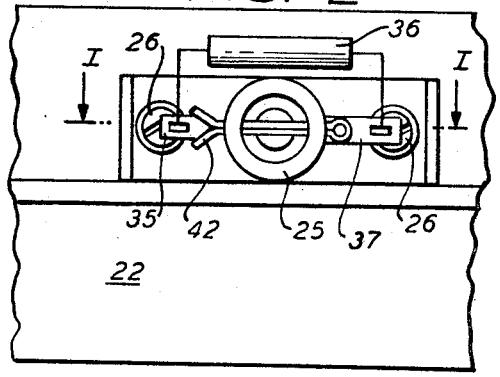
FIG. 2
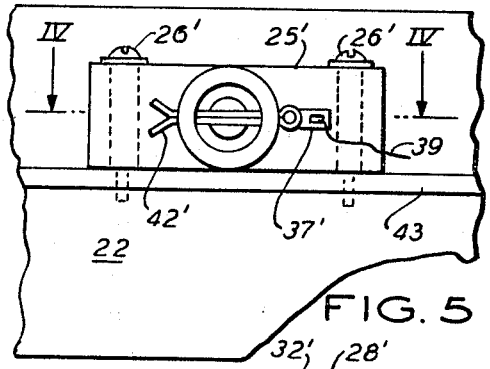
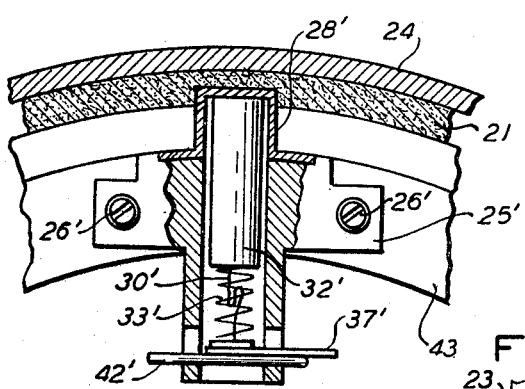
FIG. 4
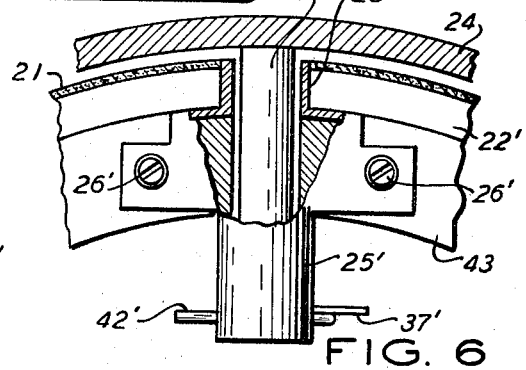
FIG. 6
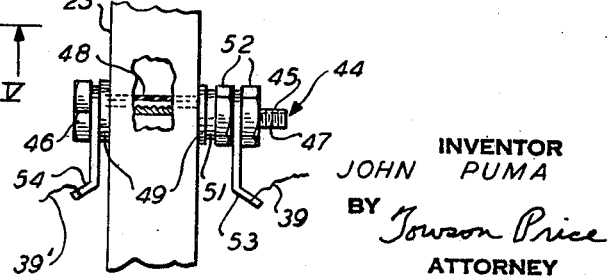
FIG. 7
INVENTOR
JOHN PUMA
BY Towson Price
ATTORNEY

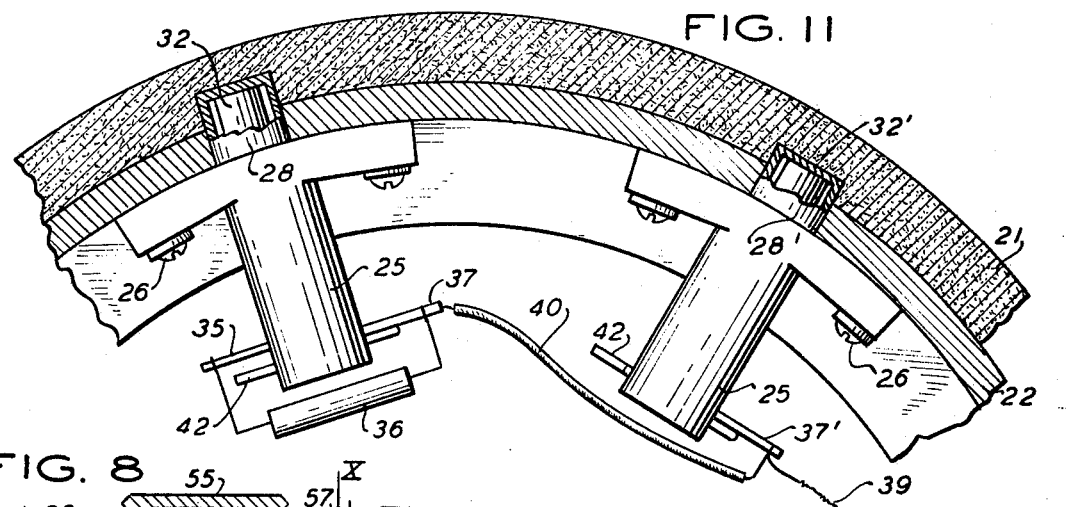
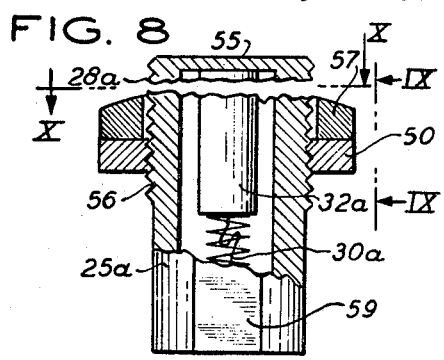
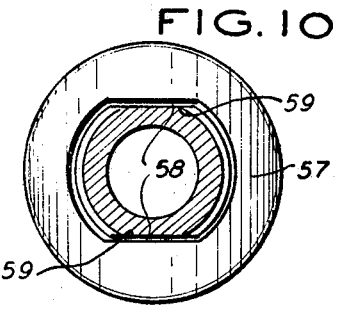
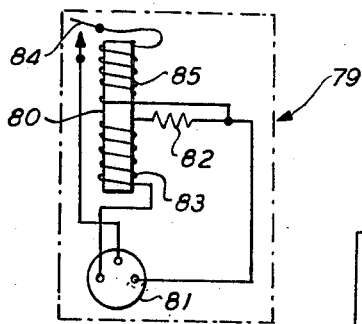
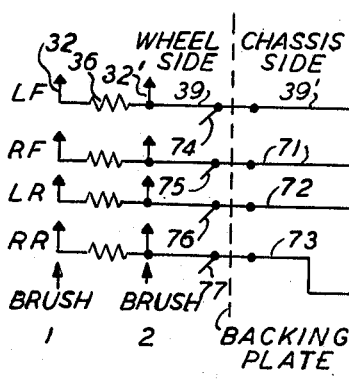
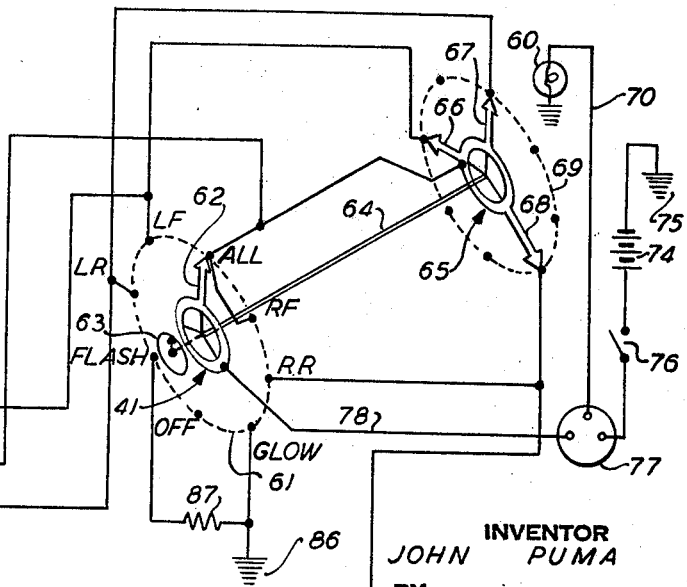

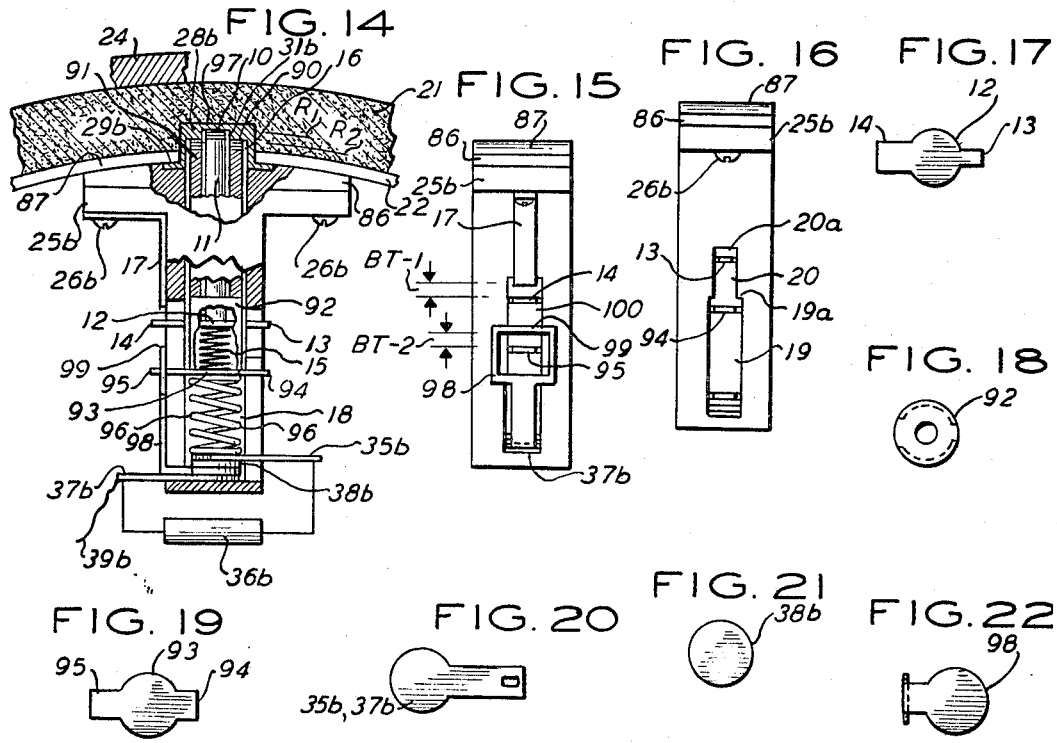
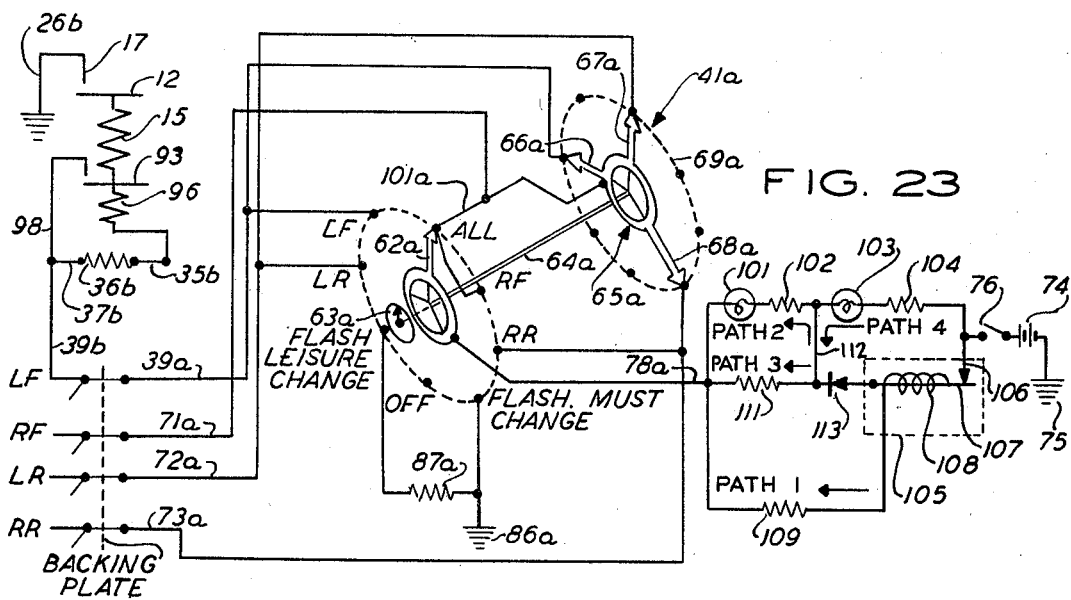

3,479,640
Patented Nov. 18, 1969

3,479,640
BRAKE LINING WEAR DETECTOR
John Puma, 65 Davenport Ave.,
Newark, N.J. 07107
Continuation-in-part of application Ser. No. 630,740,
Apr. 13, 1967. This application Nov. 8, 1967, Ser.
No. 685,232
Int. Cl. B60q 1/44
U.S. Cl. 340—69                                    15 Claims

ABSTRACT OF THE DISCLOSURE

Apparatus for indicating when the brakes on a motor vehicle need relining, using one holder having an electrical contact means reciprocable therein, and a resistor, in one embodiment; a second holder having an electrical contact means reciprocable therein in another embodiment; a terminal or electrical contact holder means having stationary and bridging terminals, double electrical contact means and a resistor in still another embodiment; corresponding single and double depth penetration plugs fitted within blind or thru openings in a brake shoe lining, an electrical circuit having one indicating lamp for the contact means embodiments and an electrical circuit having two indicating lamps for the terminal holder and double electrical contact means, but each circuit being adaptable to any embodiment, so that a first "leeway" or "leisure change" indication is given to the operator upon lining wear to a first predetermined but still serviceable extent, and an urgent second or "must change" indication is given upon continued lining wear to a second predetermined extent.

---

This application is a continuation-in-part of my now abandoned application Ser. No. 630,740 filed Apr. 13, 1967 and similarly titled.

The present invention relates to a brake-lining wear-detector and, more particularly, to an electrical brake lining wear detector for visually indicating the condition of brake linings without the necessity of making visual examination of the brakes.

At the present time, inspecting for the condition of brake linings, requires that the brake unit, or housing enclosing the brake structure be opened. In the case of automobiles, this requires the relatively laborious process of jacking up the car, removing the wheels and then reversing these steps after the inspection is complete. While such a brake inspection procedure may be considered a mere inconvenience in the case of a private or pleasure automobile, yet in commercial vehicles and fleets of the same, such as taxi cabs, trucks, buses and the like, where there is the necessity for a continued inspection program, this inspection is laborious, time-consuming, inefficient and expensive.

The present invention provides apparatus that, while functioning and not providing a visual signal, assures the operator that the brake linings are still substantially good without the necessity of removing the wheels for directly inspecting the linings.

In the first of two particular embodiments, the apparatus includes a spring-urged electrical element freely suspended and penetrating the brake lining, while utilizing the brake drum as an electrical grounding element, so that a resistive electrical continuity is made when the brake lining is reduced by wear to a particular point where replacement is desirable but not urgently necessary.

In the second of the two particular embodiments of this invention, the apparatus includes a spring urged second electrical element freely suspended and penetrating the brake lining, also utilizing the brake drum as an electrical grounding element, so that a non-resistive electrical continuity is made when the brake lining is further reduced by wear to a particular point where replacement is urgently necessary. Other apparatus is provided to complete the electrical continuity for each of the two indications.

In still another or third embodiment of this invention, the apparatus includes first and second spring-urged non-electrical elements freely suspended and penetrating the brake lining, the first element freely slidable within the second element, while utilizing the brake shoe as an electrical grounding element, so that a resistive electrical continuity is made by and thru a corresponding first set of electrical terminal means when the brake lining is reduced by wear to a particular point where replacement is desirable but not urgently necessary; and a non-resistive electrical continuity is made by and thru a corresponding second set of electrical terminal means, while the first set is in terminal contact, when the brake lining is further reduced by wear to a particular point where replacement is urgently necessary. Still other apparatus is provided to complete the electrical continuity for both indications.

The apparatus hereinafter described is adaptable to being built into the vehicle, as might be desired in a pleasure or private automobile, or as apparatus such as might be used to test quickly and efficiently a large number of vehicles not initially including the same.

It is thus an object of my invention to provide apparatus for indicating the operational condition of a brake lining without the necessity of examining or opening the housing enclosing the same.

Another object is the provision of apparatus for indicating the state of friction material otherwise relatively inaccessible.

A further object is to provide instantaneous indication when brake linings, or other relatively inaccessible wearable material, reach a point of wear such that the wearable material must be changed.

Still another object is provision of apparatus to test by remote means the condition of brake linings without interferring with the normal operation of equipment carrying the same.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a sectional view on the line I—I of FIGURE 2 in the direction of the arrows, when the brake is applied, showing a deep depth penetration plug before wear thru, and is on a plane perpendicular to the axle of the wheel to which an embodiment of my invention is applied, parts being in elevation.

FIGURE 2 is an elevational view on the line II—II of FIGURE 1, in the direction of the arrows.

FIGURE 3 is a view corresponding generally to FIGURE 1, but showing the brake lining and penetration plug after wear to a level immediately following complete wear-off of plug cap section, with the brush urged by a spring into electrical contact with the brake drum, and with the brake not applied.

FIGURE 4 is a sectional view on the line IV—IV of FIGURE 5 in the direction of the arrows, with the brake lining and brake drum also in sectional view, and when the brake is applied, showing a shallow depth penetration plug before wear thru, and is on a plane perpendicular to the axle of the wheel to which another embodiment of my invention is applied, and parts being in elevation.

FIGURE 5 is an elevational bottom view on the line V—V of FIGURE 4, in the direction of the arrows.

FIGURE 6 is a view corresponding generally to FIGURE 4, but showing the brake lining and pentration plug after wear to a level immediately following complete wear-off of the plug cap section, with the brush urged by a spring into electrical contact with the brake drum, and with the brake not applied.

FIGURE 7 is a sectional view through the back-up plate or, for disc brakes, the inner caliper housing, to show how an electrical connection is made at the vehicle wheels from the main indicator circuit to any of the four embodiments.

FIGURE 8 is a fragmentary sectional view of still another embodiment, which may also be employed with disc brakes, wherein the brush detector is threaded in place and secured by washer and locknut.

FIGURE 9 is a fragmentary elevational view, on the line IX—IX of FIGURE 8, in the direction of the arrows.

FIGURE 10 is an axial sectional view of the washer and plug of FIGURES 8 and 9, on the line X—X of FIGURE 8 in the direction of the arrows.

FIGURE 11 is a sectional view, with the brake drum not illustrated, showing a first penetration indicator and a second penetration indicator electrically connected, to make a two-brush-per-shoe arrangement.

FIGURE 12 is a wiring diagram of apparatus embodying a one lamp form of my invention.

FIGURE 13 is a wiring diagram of a flasher device for use with the FIGURE 12 form of my invention.

FIGURE 14 is a sectional view of another embodiment of my invention, when the brake is applied, corresponding generally to FIGURE 1, but showing how to obtain a two stage indication of wear at one place, rather than at two places as in FIGURE 11.

FIGURE 15 is an elevational view from the left of the structure shown in FIGURE 14.

FIGURE 16 is an elevational view from the right of the structure shown in FIGURE 14.

FIGURE 17 is a detailed plan of the upper or first bridge terminal, a side edge view of which appears in FIGURE 14.

FIGURE 18 is a detailed top plan of the table device, the legs of which confine the first bridge terminal or that of FIGURE 17.

FIGURE 19 is a detailed plan of the lower or second bridge terminal.

FIGURE 20 is a detailed plan of the two resistor support and terminating connectors located at the bottom of the structure of FIGURE 14.

FIGURE 21 is a detailed plan of the insulator which is disposed beneath the upper of the two resistor support connectors of FIGURE 20.

FIGURE 22 is a detailed bottom plan of the stationary second make terminal, a side edge view of which appears in FIGURE 14, the circular portion of which is disposed between insulator of FIGURE 21 and the lower of the two resistor support connectors of FIGURE 20.

FIGURE 23 is a wiring diagram of apparatus embodying a form of my invention employing two lamps.

Referring to the drawings in detail and first considering the detector embodiment of my invention shown in FIGURES 1, 2, and 3, these figures illustrate the electrical components arrangement, particularly an electrical resistor 36 as combined with a deep depth penetration plug 28, said combination being used for a first penetration indicator of a two-electrical contact means or two-brush-per-shoe arrangement as shown in FIGURE 11. The embodiment is shown schematically, for use with brake lining 21, mounted in conventional fashion on a brake shoe 22. The shoe 22 is conventionally supported by a backing plate 23, FIGURE 7, in operative relationship with a braking element, here shown as a drum 24, for contacting said lining upon the application of the brakes, as by means of a foot pedal (not shown), as is understood in the art. Mounted on the underneath curved surface of the brake shoe 22 is an electrical contact means or brush holder 25, having ears extending to form its base, and secured in place by means of screws 26. Said screws may also be of the lock-wire type, passing through holes in extended ear portions of said holder and threaded into adjacent parts of the shoe 22.

The shoe is apertured at 27 to receive the closed end portion of an insulating depth-penetration plug 28 having an outstanding base flange 29 fitted into brush holder 25. The adjacent portion of the lining 21 has a blind pocket or thru aperture 31 coaxial with shoe aperture 27, in which said plug 28 is set and its penetration limited by said flange 29. The electrical contact means or brush 32, made of suitable conductive material that may include carbon or graphite, and which will not score the brake drum 24, is continuously urged by spring 33 in the direction of the drum 24.

Connection of each electrical contact means or brush 32 and 32′ shown as arrows in the wiring diagram of FIGURE 12, and/or 32a, shown in FIGURE 8, is made through a pigtail lead 30, 30′ and/or 32a, (see also FIGURE 4) a metal disc 34, in some instances a terminal 35 and a resistor 36, and a terminal 37 or 37′. Said terminals 35 and 37 are separated by an insulator 38 and each terminal desirably consists of a circular body whose diameter is slightly less than the brush housing diameter of holder 25 (25′ FIGURE 4, 25a FIGURE 8) and having a long slender tab, with a lead-receiving hole near its end extending therefrom, providing the electrical connecting and resistor support means. Upon assembly said terminal tabs project outwardly thru windows, on each side of the holder 25 and only wide enough to receive a tab. Said electrical components are held in place in the holder 25, with the spring 33 in a compressed state, by suitable means, such as a cotter pin 42. Although the diagram of FIGURE 12 shows the lead and resistor elements numbered only for the left front brake of a vehicle, it will be understood that the connection is similar for the other brakes on the vehicle under consideration.

FIGURES 4, 5 and 6 show another indicator embodiment of my invention, wherein the brush holder 25′ is mounted and secured to rib 43 and the shoe 22′ by screws 26′ and illustrate the electrical components arrangement, particularly the absence of an electrical resistor and the use of a shallow depth penetration plug 28′, but otherwise the same as before described for FIGURES 1, 2 and 3, to form a second penetration indicator of a two-brush-per-shoe arrangement as shown in FIGURE 11.

The function of deep penetration plug 28 and shallow penetration plug 28′, both made of suitable insulating wearable material, that is, wearable as the brake lining and not scoring the brake drum, is to maintain their respective brushes 32 and 32′ against their closed ends until such time as the lining 21 is worn to a level corresponding to the complete wear-off of said closed ends (of the cap 55, in the embodiment of FIGURES 8, 9 and 10), at which time said brushes 32 and 32′ will travel to and make continuous electrical contact with drum 24, whether or not the brakes are applied, as shown in FIGURES 3 and 6 for the first and second indicator penetrations, respectively.

FIGURES 8, 9 and 10 show still another indicator embodiment of my invention, wherein the penetration cap 28a having a closure 55, is an integral part of brush holder 25a. Said holder is threadedly engaged by its cap section to the underneath curved surface of the brake shoe (not shown) and protrudes therethrough, much the same as the penetration cap of FIGURE 1 or 4 protrudes into the brake lining. Cap 28a is made of suitable insulating material, wearable as the brake lining and not scoring the brake drum. Penetration for use as a first or second penetration indicator, is adjustable by turning the holder 25a to move it more or less toward the brake shoe. This embodiment is particularly suitable for use with disc brakes (not shown) wherein the brush holder 25a is threadedly engaged as before mentioned, but to the flat surfaced lining pad shoe (not shown) or to a tab extending therefrom, with the cap section 28a and closure 55 directed straight forwardly towards the brake disc. For the curved surface brake shoe 22 (not shown) penetration is adjustable to within one-half thread pitch of thread 56, and use of space washer 57 fitting said curved surface and having flat or non-cylindrical portions 58 to non-turnably engage mating portions 59 on the holder 25a, said holder and washer 57 being secured by means of a locking nut 50. For use with disc brakes, washer 57 must have both sides as flat surfaces. The electrical contact means or brush 32a is held in place and connected as in one of the preceding forms; see FIGURES 1 and 4. The inner caliper housing is to serve as the support.

FIGURE 11 illustrates a first (left) and second (right) electrical contact means or brush penetration indicator, circumferentially spaced from each other along the shoe 22, each shown with a brush holder 25, but could be just as well be shown with brush 25', FIGURE 4, or holder 25a FIGURE 8. The first penetration brush indicator is electrically arranged as carrying a resistor 36, and has a deep penetration plug 28, as before described and shown in FIGURES 1, 2 and 3. The second penetration brush indicator is electrically arranged as not carrying an electrical resistor 36, and also minus a terminal 35 and an insulator 38, but has a shallow penetration plug 28', as before described and arranged as shown in FIGURE 4. Terminal 37' is connected to terminal 37 by a lead 40, and to terminal 53 on the wheel side of backing plate 23, FIGURE 7, by lead 39.

A terminal such as 44, FIGURE 7, is provided in the support, inner caliper plate or backing plate 23 to make a thru connection from the chassis side of the vehicle to a brush or brushes on a fully enclosed brake shoe on the wheel side of the chassis. On the chassis side only, the terminal is arranged to make an underchassis test of the system, with an ohmmeter or other test means as by providing a pocket to form a female banana plug to receive a male banana plug, not shown, or to have an end portion extended for attaching a connection clip. Each terminal 44 here includes a conductive rod 45, carrying a head 46 on one end and threads 47 on the other. It here passes through the backing plate 23 and is insulated therefrom by a sleeve 48 and washers 49. A flat metal washer 51 may be disposed between the outer face of the insulating washer 49 and one of the nuts 52 which clamp a terminal tab 53 therebetween and hold the terminal 44 in place. The head 46 of the rod 45 holds a terminal tab 54, to which system leads such as 39' are connected, in place against one of the washers 49.

Thus, in a two-brush-per-shoe system, applied to one or both shoes of each wheel, the plugs are desirably of two different penetration depths. The first, having the longer depth, is to warn of lining wear which is still serviceable for some extended driving, depending on individual or fleet circumstances. The shorter depth plug is to warn of the need for immediate change of lining, with perhaps only a maximum of 50 to 200 miles extended driving. In a one-brush-per-shoe system, all of the plugs are of the same depth and a choice can be made of either of the two depths, or of any variation therebetween, depending on individual or fleet circumstances, but it is recommended that the longer depth plug be used.

In the circuit arrangement as illustrated in FIGURE 12, it is necessary to use the brush and resistor assembly with the longer depth plug as the first penetration event. For the second penetration event it is necessary to use a brush assembly (no resistor) with the shorter depth plug. In one-brush-per-shoe system, and if a flashing intermittent on-and-off lamp indication is desired, it is necessary to use the brush and resistor assembly. If a full brilliancy lamp is desired, it is necessary to use a brush assembly with no resistor.

Referring now to FIGURES 12 and 13, it will be seen that the electrical contact means or brushes, such as 32, 32' and 32a, are connected to an indicator lamp 60 through the selector switch 41 and the flasher relay of FIGURE 13. Said switch may be formed generally like a wafer switch, similar to but not the same as the No. 1321L Rotary switch manufactured by the P. R. Mallory & Co., Inc., Indianapolis, Ind.

As shown here schematically, the eight position switch 41 comprises a front wafer 61 over which a connecting pointer 62 travels as moved by a control knob 63. The connecting pointer 62 is fixed on a control shaft 64, also carrying three connecting pointers 66, 67 and 68 which may be caused by serially travel over the eight positions on a rear wafer 69. Certain contacts on the wafers are connected to the brushes on the vehicle brake shoes of all of the wheels by leads 39', 71, 72 and 73, each lead connected to its respective wheel terminal 54, FIGURE 7, and by branch leads 74, 75, 76 and 77 to other brushes on other brake shoes of the same wheels. RF., LF., etc., represents the brake elements located at right front, and left front wheels, etc., reference being had from the driver's seat.

It will be seen that with the pointer 62 and pointers 66, 67 and 68 placed as shown in FIG. 12, all of the brushes 32, 32' and/or 32a are electrically common to the system. The system is connected to the battery 74 of the vehicle, one side of which is grounded at 75, through the ignition switch 76, flasher socket 77 and lead 78 to the selector switch 41. Connection is made from the socket 77 to the lamp 60 through lead 70.

The circuit of the flasher device 79 is illustrated in FIGURE 13. It is a basic one as used on a differential relay and while not necessarily the one that will be used on actual installations, it is shown here for purpose of illustration. However, the function of the flasher, which includes coils 83 and 85 on a suitable soft iron core 80, is two-fold. Its first function is to cause the indicator lamp 60 to flash intermittently on-and-off at the instant of the penetration of a first electrical contact means or brush thru its plug due to brake lining wear, regardless of the wheel brake on which the penetration takes place. Its second function is to stop the flashing and cause the indicator lamp to glow with full brilliancy at the instant of a second electrical contact means or brush penetration. Although the circuit illustrated will perform in this manner, a circuit can also be arranged to perform so that it will glow on a first penetration and flash intermittently on a second penetration. This would be a matter of choice and standardization.

With the vehicle in operation and the selector switch 41 in, for example, the illustrated "all" position, at the instant of a first brush penetration, in the embodiments of FIGURES 1 to 11, inclusive the brush contacts ground potential at the braking element or drum 24 at all times thereafter, regardless of whether or not the brakes are applied. With the flasher 79 connected, as by having its contact plug device or base 81 fitted in the socket 77 of FIGURE 12, it's current is caused to flow thru flasher resistor 82, coil 83, lead 78, pointer 62 of selector switch 41, the various leads from said switch, penetrated brush 32, and resistor 36, magnetizing the relay core and pulling closed the flasher armature contact 84.

With the armature contact 84 closed, current also flows thru oppositely wound coil 85 and indicator lamp 60. The entire resistance of the coil circuit 85, including the lamp 60, is equal to the entire resistance of coil circuit 83, causing equal current to flow in each coil but with opposite magnetizing polarities, thereby cancelling the armature pull of coil 83, causing the armature contact 84 to open and stop the current flow to the indicator lamp 60. Since the electrical contact means or brush remains contacted to ground, the circuit is now restored to the instant of first electrical contact means or brush penetration and the cycle is unlimitedly repeated, giving a flashing indicator light.

At the instant of a second electrical contact means or brush penetration, such as that of 32′, even though the first electrical contact means or brush 32 is in contact with the drum, the resistor 36 of the first device 32, is shunted out. This shunting out of the resistor causes a stronger current to flow through coil circuit 83, effecting a stronger pull on the armature contact 84 then when the first contact caused the pull. Since there is no disturbance to the entire circuit resistance of the coil 85 and the cancelling effect is relatively reduced, the armature contact remains constantly pulled to the closed position, causing the lamp 60 to glow with full brilliance. Conventional coil type flashers as used with turn signals are enclosed in metal with three terminal stabs protruding thru the base for mounting on a socket, such as 77, and having a separate armature contact for the indicating lamp.

The rotary selector switch 41 is illustrated in its simplest form and provided to monitor first and second electrical contact means or brush penetration, regardless of which wheel bake. It spots the wheel brake at which it happens, tests for lamp and flasher operation to assure system operation, and shuts the system off. The "all" position makes all the wheel brakes common to each other and is to be used to determine a first penetration, regardless of the brake location. On such an indication, turning the switch to the individually indexed wheel brakes will determine the exact location of a penetration. The "flash" and "glow" positions are to test the flasher and lamp operations.

With the switch moved thru the contacts to the "flash" position, a connection is made to ground 86 thru the switch resistor 87 with a resistance value equal to that used on a resistor brush 32, simulating a connection to ground by the first contact means or penetration resistor brushes, causing the flasher 79 and the indicator lamp 60 to flash on-and-off intermittently. In the "glow" position connection is made directly to ground, now simulating a connection to ground by any of the second contact means or penetration brushes 32′, causing a greater constant pull on the armature contact 84 and further causing the lamp 60 to glow with full brilliancy. The "off" position is provided to shut the system off and eliminate any distraction it may cause, once a penetration has been indicated.

Referring now to the embodiment of my invention illustrated in FIGURES 14 to 23, inclusive, there is shown a form of indicator in which, in addition to other elements contained within hole 18 of terminal holder 25b, FIGURES 14, 15 and 16, the indicator essentially consists of two pileups of elements. The first, a ground-connecting first indication pileup, includes a single piece of equivalent height multiple-layer rod spacer 10 and rod 11, the two forming the first pileup triggering elements, a grounding first bridge terminal 12, having a stop wing 13 and a terminal wing 14, a first bridge terminal spring 15, and a resistor-shunting second bridge terminal 93. The second, a resistor-shunting second indication pileup, includes a single piece or equivalent height multiple layer sleeve spacer 90 and sleeve 91, the two forming the second pileup triggering elements, a table 92, the aforementioned resistor-shunting second bridge terminal having a stop wing 94 and a terminal wing 95, and a second bridge terminal spring 96. Said spring 96 is stronger than the first bridge terminal spring 15, and acts on both the grounding and shunting element pileups.

The first and second bridge terminals 12 and 93 being electrically common to each other thru said first bridge terminal spring 15, are also electrically common thru said second bridge terminal spring 96 to resistor support terminal 35b, to which is connected one end of a resistor 36b. Another resistor support terminal 37b, to which is connected a lead wire 39b and the other end of the resistor 36b, together with said resistor terminal 35b support said resistor 36b.

A stationary resistor-shunting terminal 98, with a part first extending outward and then upward, and having a window opening closed by terminal contact stop 99 at the uppermost end, to receive but not touch and to permit free upward travel of terminal wing 95, is posed on and electrically common with resistor support terminal 37b. Between said terminal 98 and resistor support 35b is interposed a disc insulator 38b. The second bridge terminal 93, resistor support terminals 37b and 35b, and resistor shunting terminal 98, have partially circular central areas, the diameters of which are slightly less than that of the holder pileup hole, to permit free and easy vertical movement of the second bridge terminal 93 and to maintain the elements within the limits of said hole.

The table 92 comprises a disc having a central circular hole of a size to permit free and easy travel of the rod 11 therethru, and integral front and rear legs extending therefrom and curved like the outer edge of the disc to form open-ended slots at the sides to receive and permit free and easy vertical travel of terminal wing 14 and stop wing 13. The legs and the slots are of such a length as to accommodate spring 15 and allow for full travel of the first bridge terminal 12 with its wings to its electrical make position. Said table 92 can be electrically conductive or non-conductive, but because of its skeleton form, preference is given to use of metal.

The first bridge terminal 12 has a partially circular central area whose diameter is slightly less than the diameter formed by the curved legs of table 92, to permit its free and easy vertical movement and keep said first bridge terminal 12 within the confines of said curved legs. Sleeve 91, having a circular hole extending longitudinally along its axis to receive and permit free and easy vertical travel of rod 11 therethru, together with similarly formed sleeve spacer 90 and table 92, comprise the vertical spacers to maintain at a static level, the second bridge terminal 93 with its terminal wing 95 and its top wing 94, a distance BT-2 from end member 99 of terminal 98. Said sleeve 91, sleeve spacer 90, table 92, and second bridge terminal 93 are under the constant urging of spring 96.

Rod 11 and rod spacer 10 comprise the vertical spacers to maintain at a static level, the first bridge terminal 12 with its terminal wing 14 and stop wing 13 a distance BT-1 from the end of terminal 17. Said rod 11, rod spacer 10, and first bridge terminal 12 are under the constant urging of spring 15.

Said sleeve 91, sleeve spacer 90, rod 11 and rod spacer 10, can be electrically conductive or non-conductive. It is extremely desirable that rod spacer 10 and sleeve spacer 90 be made of material such that once these elements have mechanically but individually contacted the brake drum surface, they will wear, fragmentize finely, or disintegrate, as rapidly as permissible, thus permitting said respective bridge terminals 12 and 93 to permanently contact their associated stationary terminals as soon as possible thereafter. Some of the materials that can be used, either alone, or in suitable proportions of each to form compounds or impregnations, are carbon, graphite, copper, aluminum, paper Teflon, wood, magnesium, silicones, plastics, resins, and phenolics.

In the absence of rapid wear, fragmentation, or disintegration, FIGURE 14 shows disc-formed rod spacer 10 and annular formed sleeve spacer 90 as composed of several layers of thin rubber or other suitable material. As each layer successively contacts the surface of the rotating brake drum 24, said surface will cause each layer to individually peel and roll between said brake drum and brake lining surfaces to complete decay or dislodgement, thus permitting the respective bridge terminals 12 and 93 to permanently contact their associated stationary terminals. The height of rod spacer 10 must be slightly more than distance BT-1 plus the distance between $R_1$ and $R_2$.

The height of sleeve spacer 90 must be slightly more than distance BT-2.

All of the discussed elements are to be assembled to the holder 25b in the order shown in FIGURE 14. The elements having the partially circular central areas for confinement within the holder 25b and within the curved legs of table 92 can be assembled by feeding said central areas linearly thru the slots and then rotating 90 degrees to their proper positions. All other elements can be inserted through the open end of holder 25b.

An insulating hollow dual-step penetration plug 28b has a circular base 29b, a normally horizontal outer closure 97, a cylindrical blind-end relatively shallow penetration cavity 16 to accommodate sleeve spacer 90, and a cylindrical blind-end relatively deep cavity 31b centrally positioned with respect to the cavity 16, thereby leaving it effectively annular. The cavity 31b holds rod spacer portion 10 here shown by horizontal lines at the top of the rod 11, as a series of thin generally circular layers or discs. The plug 28b is fitted thru a common opening in the brake shoe 22 and the brake lining 21. The opening at the brake lining may be either blind or thru. The extent to which shallow cavity 16 and deep cavity 31b are stepped and penetrated into the lining opening, is dependent to the amount of permissable safe wear of lining 21, and consequent wear of penetration plug outer closure 97, to such levels as to first cause the device to indicate a leeway or "leisure change" when the lining has worn to level $R_1$, and an emergency or "must change" when the lining has worn to level $R_2$. The rate of wear of the penetration plug outer closure 97 must be the same as or faster than the brake lining 21.

A radius block 86 has a circular recess to accommodate penetration plug base 29b, thus securing penetration plug 28b within the recess and against the brake shoe surface, a cylindrical surface 87, said surface to have a radius corresponding with the brake shoe used therewith, a flat surface engaged by terminal holder 25b, and a pair of wing sections each with a mounting thru hole. In order that there be no variation in any member of the entire element pileup that may result from use of one radius block for another, it is desirable to have a basic vertical height from the flat surface to the recessed surface of any radius block, regardless of its measured radius. This will result in thicker wing ends for the greater radius and accordingly reduce the wing end thickness as the radius is reduced. It now becomes necessary to change only the length of mounting screws 26b, one of which is longer than the other, for it also secures the terminal 17.

If a rectangularly formed block is substituted for the block 86, FIGURE 14, so as to fit a flat surface and have all other identities as aforedescribed, the embodiment as illustrated in FIGURES 14-23, inclusive, but with a substitution of such a rectangular block is adaptable for use with disc brakes.

The holder 25b has a flat mounting surface corresponding with and engaging the radius block flat surface, a mounting thru hole in each wing section registering with the holes of radius block 86 to receive a mounting screw 26b threadedly engaged with brake shoe 22, and a closed free end element pileup hole 18 longitudinally with and centrally thru the entire length. A ground terminal 17, having a hole to receive a mounting screw 26b, being secured and electrically grounded by means of said screw, extends inward and then downward to a level approximating a normal electrical spacing from wing terminal 14. The stop-wing side of said holder 25b has a relatively wide vertical slot 19 and a continuing relatively narrow vertical slot 20. The upper end of narrow slot 20 serves as the stop 20a for terminal stop wing 13. The corner shoulders formed at the junction of said slots 19 and 20 serve as the stop 19a for terminal stop wing 94. Stop 20a is at the same level as the contact end of the ground terminal 17, and stop 19a is at the same level as inner closure edge of contact member 99 of resistor shunting terminal 98. The terminal wing side of holder 25b has a single width slot 100, its width being the same as the relatively wider stop wing slot 19, but no terminal wing stops. The widths of said slots 19, 20, and 100, are such as to permit free and easy vertical movement of their respective stop and terminal wings.

If the holder 25b, FIGURES 14, 15 and 16, had a dual step penetration plug 28b with a relatively shallow cavity 16 and a relatively deep cavity 31b, but with a penetration cap such as 28a and a closure such as 55 in FIGURE 8, integral with said holder 25b, and said holder had an open bottom end and used a cotter pin 42 as illustrated in FIGURES 1, 2 and 3, with all other identities as aforedescribed, the embodiment as illustrated in FIGURE 14-23, inclusive, combined with flat surfaced washer 57 and locknut 50, FIGURE 8, is adaptable for use with disc brakes.

At the instant of radial wear of brake lining 21 and similarly of penetration plug closure 97 to level $R_1$, FIGURE 14, rod spacer 10, a triggering element of ground-connecting first pileup, having been confined by said closure rod spacer 10, a triggering element of ground-connecting first pileup, having been confined by said closure 97 within deep penetration cavity 31b and urged outwardly by first terminal spring 15, penetrates thru resultant opening in closure 97 and impinges against brake drum 24. In those situations where the unapplied vehicle brakes are loosely adjusted or the brake lining 21 is more than distance BT-1 away from brake drum 24, rod spacer 10 will touch said brake drum 24 only when the braking elements 21 and 24 are within the proximity of distance BT-1 from each other, such as when applying or during relaxing of the vehicle brakes.

Using the disc layer pileup arrangement for rod spacer 10, upon such impingment and touch and with the vehicle in motion, the friction of the revolving drum 24 with each consecutive layer of rod spacer pileup 10, particularly at the moments approaching full application and relaxing of the vehicle brakes, will cause each layer to rapidly peel from said spacer 10 pileup. Said peeling will continue until no exposed layers have penetrated beyond the outer surface of the brake lining 21, at which time the vehicle indicating electrical circuit becomes permanently connected to ground thru the first bridge terminal 12 and resistor 36b, to indicate a "leisure change." Since there will be a moment or perhaps several of such moments, that with continuing wear of the brake lining 21 and similarly of plug cap closure 97 approaching level $R_2$, other succeeding layers of rod spacer 10 will touch the revolving drum 24 and consequently wear off or peel from said spacer pileup 10. During said moment or moments, though it is not significant, the circuit continuity to ground will be momentarily disturbed but immediately restored. Peeling of layers from red spacer 10 is complete when sufficient layers have been removed to equal or be greater than the distance BT-1 plus the distance between $R_1$ and $R_2$.

With continued radial wear of brake lining 21 and similarly of penertation plug cap closure 97 to level $R_2$, sleeve spacer 90, an element of resistor-shunting pileup, here shown by horizontal lines at the top of the sleeve 91, as a series of thin annular layers, having been confined by said closure 97 within shallow penetration cavity 16 and urged outwardly by the second terminal spring 96, penetrates the resultant enlarged opening in closure 97 and impinges against brake drum 24. The same sequence of impingment, touch and peeling, as applicable to disc-formed layers of rod spacer 10, also applies to the annular layers of sleeve spacer 90. Wear or peeling of layers from said sleeve spacer 90 is complete when sufficient material has been removed to be equal or greater than the distance BT-2, at which time the second bridge terminal 93 permanently shunts the resistor 36b to indicate a "must change."

Where it is desired to frictionally deplete or destroy rod spacer 10 and sleeve spacer 90 by the process of rapid wear, fragmentation, or disintegration, once spacer penetration is effected at lining levels $R_1$ and $R_2$, both spacers 10 and 90 must be of one piece or equivalent height multiple sections, and each spacer may have the same or any of said depletion or destructable characteristics as obtainable by use of various materials, a few of which have been named herein.

From the moment that rod spacer 10 has begun and continues to peel, wear, fragmentize, or disintegrate, rod 11 and the first bridge terminal 12 carrying stop wing 13 and terminal wing 14, being urged by spring 15, move radially outward until such time as stop wing 13 engages holder stop 20a and terminal wing 14 contacts end of ground terminal 17, completing an electrical circuit connection from lead 39b, thru terminal 37b, resistor 36b, terminal 35b, spring 96, second bridge terminal 93, spring 15, terminal wing 14, ground terminal 17, longer screw 26b and brake shoe 22, to vehicle ground. Said circuit connection provides for limited current flow to indicate the first or "Leisure change" as will be later described.

From the moment that sleeve spacer 90 has begun and continues to peel, wear, fragmentize or disintegrate, sleeve 91 and table 92, and also the second bridge terminal 93 carrying stop wing 94 and terminal wing 95, being urged by spring 96, move radially outward until such time as stop wing 94 engages holder stop 19a and terminal wing 95 contacts member 99 of resistor shunting terminal 98, completing an electrical shunt connection across resistor 36b from lead 39b, thru terminal 37b, terminal 98, member 99, wing terminal 95, and second bridge terminal 93, to ground as before described. Said electrical shunting of resistor 36b provides for maximum current flow to indicate the second or "must change" as will be described later.

Referring further to FIGURES 14 to 22, inclusive, and now particularly to the terminal indicator electrical circuit, FIGURE 23, there is shown a two lamp "Flash-Flash" indicating control circuit that will permit a GE–408 flasher lamp 101 to flash on any first leeway or "Leisure" indication, and said lamp 101 and a GE–55 conventional lamp 103 to simultaneously flash, but not necessarily in sequence, on any second urgent or "must" indication.

The control circuit includes a King-Seeley 45677 or equivalent "constant voltage" device 105, herein used for lamp flashing purposes, having make-and-break contact points 106, a bi-metallic thermal-strip 107, and a bi-metallic strip heater coil 108. A desirably 110 ohm resistor 109 is connected in series with said heater coil 108 to form electrical path 1, and provided together with indicator resistor 36b, FIGURE 14, to limit the current thru said heater coil 108 on a first indication, to such a value that the resultant heating influencing the bi-metallic strip 107 would be just insufficient to cause opening of the points 106.

A desirably 45 ohm resistor 102 is connected in series with lamp 101 to form electrical path 2, and provided to limit the current thru said lamp 101 to cause normal filament brilliance. A desirably 20 ohm resistor 104 is connected in series with lamp 103 to form electrical path 4, and provided to limit the current thru said lamp 103 to cause normal filament brilliance. A desirably 27 ohm resistor 111 forming electrical path 3, is provided as a voltage-drop resistor to cause a proper voltage across lamp 101 and series resistor 102 electrical path 2 when contact points 106 are closed, and serves as the main circuit path with jumper lead 112 for lamp 103 and series resistor 104, electrical path 4, when contact points 106 are open.

A rectifier 113 connected in series with bi-metallic strip 107 and parallel paths formed by circuit paths 2 and 3, is provided to block current flow from lamp electrical path 4 that would otherwise conduct thru bi-metallic strip 107, heater coil 108, and electrical path 1, when contact points 106 are open. Such current flow is objectionable because the heater coil 108 would then continuously conduct a fluctuating current, depending on whether contact points 106 are open or closed, and possibly cause damage to said flasher device 105. It is desirable that the heater coil 108 conduct current only while the contact points 106 are closed.

The rotary switch 41a, FIGURE 23, is operated for indicated position and circuit function as before described for rotary switch 41, FIGURE 12, except that "Flash Leisure Change" and "Flash Must Change" are substituted for "Flash" and "Glow," respectively. The otherwise corresponding parts have similar reference numbers but with the suffix a added.

With the vehicle in operation and the switch indicating dial 63a in the "All" position, at the instant of a first indication at any of the indicators as before described, FIGURE 14, and assuming such indication event at the left front wheel brake indicator, FIGURE 23, current will simultaneously flow thru each of electrical parallel paths 2 and 3, FIGURE 23, and also thru electrical path 1, converge thru switch lead 78a thru pointer 62a, switch cross lead 101a, lead 39a, backing plate terminals and lead 39b as before described, FIGURE 7, indicator resistor and terminal elements to ground. The combined effect of the current thru electrical paths 1, 2 and 3, causes a voltage drop across the resistor 111 in path 3. This voltage is also impressed across flasher lamp path 2 in parallel with it and causes lamp 101 to flash continuously with reasonable brilliance. Since the currents of electrical paths 1, 2 and 3 also flow thru the desirably 10 ohm indicator resistor 36b, FIGURE 23, it causes a voltage drop thereacross. Said voltage limits the current thru the heater coil path 1, to one insufficient to cause the bi-metallic thermal strip to deflect and, therefore, contact points 106 remain closed.

At the instant of a second indication at any of the indicators as before described, FIGURE 14, the second bridge terminal 93 shunts across the indicator resistor 36b and connection is made directly to ground, eliminating the voltage drop across said resistor, causing an increase of current thru each of the electrical paths 1 and 3, raising the voltage across each path accordingly. The current rise in the heater coil path 1 causes increased heating of the bi-metallic strip 107, to deflect said strip 107 and open the contact points 106. Opening of said contact points 106 causes current to flow thru the lamp 103, electrical path 4, in two directions. One current is thru said lamp 103, path 4 and resistor path 3, and the other current is thru the lamp 103 path 4 and the lamp 101 path 2, provided the flasher lamp 101 is in the conductive sequence. At the same time that the contacts are open, current ceases to flow thru the bi-metallic strip 107 and resistor path 3, and also ceases thru the heater coil 108 and resistor path 1, causing the bi-metallic strip 107 to cool and remake the contacts. This repeated make-and-break of the contacts 106 causes the lamp 103 to light when the contacts are open and stay dark when they are closed, giving effort to a flashing lamp.

The circuit shown will operate in a 12 to 16 volt battery system, the 16 volt being the voltage to which the battery may possibly build up to when subjected to any overly adjusted charging system. Knowing this basic circuit, changes can be made to the various resistors, and if necessary either or both of the lamps may be changed to those having the characteristics desired for operation on a 6 volt, or a 24 volt or other systems. For operation on any voltage system consideration must be given to the wide variation in the forward resistance that may be inherent in one commercially available rectifier or another of the same type, which to some degree will determine the resistance value of the suggested 27 ohm resistor 111.

In those instances where the rectifier 113 forward resistance is very low, it may be desirous to add a resistor immediately before or after said rectifier to produce a voltage, across the lamp 103 and resistor 104 path 4 while the contacts are closed, low enough to not cause undesired brilliance of said lamp 103. The addition of such a resistor in the rectifier circuit could be reason enough to reduce the value of the resistor 111 and increase the value of the indicator resistor 36b to give a combined result of more constant voltage and less critical response to the shunting of the resistor 36b with respect to the flasher 105 operation for a second indication.

The principal points to consider are that there is one set of voltages across the various elements on a first indication, and two sets of voltages across the same elements on a second indication. One of the two sets of voltages on a second indication is obtained when the flasher contact 106 is closed, and the other set when said contact 106 is open. Though it is quite difficult to maintain the same voltages across each lamp for each circuit operation these voltages can be controlled to within ranges that will operate each lamp from reasonable to full brilliance, when required to indicate. Since the lamp 101 operates and is subject to all conditions of first and second indications, it is desirable to choose those values of resistors for the entire circuit, from the standpoint of providing the most constant voltage to said lamp 101, for all operating conditions, but still obtain a broad range of flashing operation thru the indicator resistor. The flasher unit 105 has an adjusting screw to provide more or less force against the contact points, to make an accurate adjustment as to the opening of the contact points with respect to the temperature rise produced by the heater coil 108 and the bi-metallic strip 107 currents.

The circuit described may be called a "2 Lamp Flash-Flash" circuit, as it provides for one flashing lamp on the first indication, and two flashing lamps on the second indication. This same circuit, using two #55 lamps or other suitable non-flashing lamps, with different values of resistanches, can also be made to operate as a "2 Lamp Glow Flash" circuit, which provides for one lamp to glow on the first indication, and the same lamp to glow with some effect of flashing and a second lamp to flash on a second indication.

Having now described my invention in detail in accordance with the requirements of the patent statutes, those skilled in this art will have no difficulty in making changes or modifications in the individual parts or their relative assembly in order to meet specific requirements or conditions. The indicating circuits, including the respective components illustrated and described, are set forth in specific terms. However, it is to be understood that modifications of these, the use of other indicating circuits to provide for similar and other combinations of glowing and flashing lamps, or other electrical circuit-controlling components, may be used in combination with, or in place of, the resistors 36 and 36b.

I claim:

1. Wear detector apparatus for use with brake lining mounted on a brake shoe, a braking element for intermittent frictional contact with the adjacent surface of said lining and a support for said shoe comprising a hollow depth-penetration plug fixed to said shoe and with a closed end portion fitting a cavity in said lining and a pocket opening away from said lining and extending to a depth therein corresponding with a thickness of lining considered critical, an electrical contact means holder carried by said shoe, electrical contact means with end portions in said pocket, reciprocable in said holder and spring pressed into engagement with the closed end of said plug, and a circuit connecting the electrical contact means to an electrical power source and an indicator, whereby when the lining and closed end portion of the plug wears, so that said electrical contact means is grounded, a circuit is established through said indicator to show that said lining has worn to such a critical level.

2. Wear detector apparatus as recited in claim 1, wherein the braking element is a drum, said electrical contact means holder and the depth penetration plug are fixed to the back of said shoe, and a coil spring acts between the end of said contact means away from said drum and an abutment holding electrical terminal means thereagainst.

3. Wear detector apparatus as recited in claim 1, wherein the braking element is a drum, said electrical contact means holder is fixed to a side of a rib outstanding from the back of said shoe, and a coil spring acts between the end of said contact means away from said drum and an abutment holding electrical terminal means thereagainst.

4. Wear detector apparatus as recited in claim 1, wherein there is a second hollow depth-penetration plug fixed to said shoe and circumferentially spaced from the first plug, an associated electrical contact means holder and contact means reciprocable therein, the cavity in the lining for the second plug has a depth different from that of the cavity for the first plug, and a resistor is in series with only one of said contact means in said circuit, so that the indicator shows, first, when the lining is worn to a predetermined extent and, second, when the lining is so further worn that relining is necessary.

5. Wear detector apparatus as recited in claim 1, wherein the depth-penetration plug is part of the holder and has the shoe-adjacent end provided with threads fitting a threaded aperture in the shoe and held in place by a lock nut and appropriately-contoured washer.

6. Wear detector apparatus as recited in claim 1, wherein there is such a depth-penetration plug and electrical contact means fixed to each shoe of each wheel of the vehicle.

7. Wear detector apparatus as recited in claim 6, wherein there is a second depth penetration plug and electrical contact means fixed to each shoe and a selector switch between the contact means and the indicator, so that turning of the switch will show which of the brake linings needs attention.

8. Wear detector apparatus as recited in claim 7, wherein the indicator is a lamp and there is a flasher device associated with said selector switch so as to give a flashing signal when one set of contact means closes an electrical circuit and a continuous signal when the other set of contact means closes an electrical circuit.

9. Wear detector apparatus as recited in claim 1, wherein the shoe is held by a support in operative relationship with said braking element, a terminal making thru connection in said support, one end of which is connected to said contact means and the other end of which is connected to said indicator, said terminal including a conductive rod carrying a head at one end and threads at the other, a sleeve with washers at either side of said plate insulating said rod therefrom, a terminal tab for connecting with said contact means held on said threaded end by nuts, the head of said rod holding a terminal tab in place at the other side of said plate, and an outwardly opening pocket in said head forming a connector for under-chassis testing.

10. Wear detector apparatus as recited in claim 1, wherein the braking element is a drum, said contact means holder and the depth penetration plug are fixed to a part of said shoe, a coil spring acts between the end of said contact means away from said drum and an abutment holding electrical terminal means thereagainst, a second hollow depth-penetration plug fixed to said shoe and circumferentially spaced from the first plug, an associated contact means holder and a contact means reciprocable therein, a coil spring acts between the end of said contact means away from said drum and an abutment holding electrical terminal means thereagainst, the cavity in the lining for the second plug has a depth different from that of the cavity for the first plug, and a resistor is in series with only one of the contact means in said circuit, there is a flasher device associated with said selector switch so as to give a flashing signal when one contact means closes an electrical circuit and a continuous signal when the other contact means closes an electrical circuit, the shoe is supported in operative relationship with said drum, a terminal one end of which is connected to said contact means and the other end of which is connected to said indicator, said terminal including a conductive rod carrying a head at one end and threads at the other, a sleeve with washers at either end, insulating said rod, a terminal tab for connection with said contact means held on said threaded end by nuts, the head of said rod holding a terminal tab in place, and an outwardly-opening pocket in said head forming a female banana plug to receive a male plug for under-chassis testing.

11. Wear detector apparatus as recited in claim 1, wherein the plug has a penetration cavity, the electrical contact means being spring-pressed toward and fitting in said cavity, and a bridge terminal mounted on said holder and held from a grounding contact by said electrical contact means, whereby, when the lining and closed end portion of the plug wear so that said bridge terminal is released to be grounded, a circuit is established through said indicator and a resistor to show that the lining has worn to an extent that consideration should be given to relining.

12. Wear detector apparatus as recited in claim 1, wherein the plug has a first relatively-deep penetration cavity surrounded by a second relatively-shallow penetration cavity, the electrical contact means being spring-pressed toward said cavities and comprising a rod with an end fitting in said first cavity and a sleeve in which loosely fits said rod and fitting said second cavity, a first bridge terminal initially held from a grounding contact by said rod, a resistor to be in series with the indicating circuit upon operation of said first bridge terminal, and a second bridge terminal initially held from a resistor-shunting contact by said sleeve, said bridge terminals being mounted on said holder, whereby when the lining and closed end portion of the plug wear so that said first bridge terminal is released to be grounded, a circuit is established through said indicator and resistor to show that the lining has worn to an extent that consideration should be given to relining, and wherein when sufficient wear occurs that the second bridge terminal is released, the resistor is shunted and a more urgent indicator signal is given.

13. Wear detector apparatus as recited in claim 11, wherein said bridge terminal comprises a central portion disposed between said contact means and spring, and guiding tabs extending therefrom in opposite directions, said holder having slots in its sides in which said tabs move, and a grounding terminal lying along said holder and engaged by one of said tabs when the bridge terminal is spring-moved after the plug and contact means have been worn to a predetermined extent.

14. Wear detector apparatus as recited in claim 12, wherein each bridge terminal comprises a central portion enclosed in said holder, and guiding tabs extending therefrom in opposite directions, said holder having slots in its sides in which said tabs move, and grounding terminals lying along said holder and engaged by one tab of each terminal when the bridge terminals are spring-moved after the plug and contact means have been worn to a predetermined extent.

15. Wear detector apparatus as recited in claim 14, wherein the spring means compresses a relatively-weak spring disposed between said bridge terminals and a relatively strong spring acting on the other side of the second bridge terminal.

References Cited

UNITED STATES PATENTS

| | | | |
|---|---|---|---|
| 2,146,357 | 2/1939 | Schweikle | 340—52 XR |
| 2,731,619 | 1/1956 | Fratus | 200—61.4 XR |

ALVIN H. WARING, Primary Examiner

U.S. Cl. X.R.
200—61.4; 340—52